United States Patent [19]

Weber

[11] Patent Number: 5,747,566
[45] Date of Patent: May 5, 1998

[54] WATER-INSOLUBLE AZO COLORANTS BASED ON AMINOQUINAZOLINEDIONES

[75] Inventor: Joachim Weber, Frankfurt, Germany

[73] Assignee: Hoechst Aktiengesellschaft, Frankfurt, Germany

[21] Appl. No.: 694,162

[22] Filed: Aug. 8, 1996

[30] Foreign Application Priority Data

Aug. 9, 1995 [DE] Germany ............... 195 29 262.6

[51] Int. Cl.⁶ .................. C08K 5/3495; C03C 17/00; C09D 5/00; C09B 29/52

[52] U.S. Cl. .................. 524/93; 106/14.5; 106/21 D; 106/22 D; 106/22 K; 523/160; 523/161; 534/579; 534/581; 534/767

[58] Field of Search .................. 524/93; 523/160, 523/161; 106/14.5, 21 D, 22 D, 22 K, 170.1, 173.04; 534/767, 579, 581

[56] References Cited

U.S. PATENT DOCUMENTS

| | | | |
|---|---|---|---|
| 3,869,439 | 3/1975 | Schundehutte | 106/14.5 |
| 3,963,693 | 6/1976 | Mory | 106/173.04 |
| 4,014,863 | 3/1977 | Stephan et al. | 106/97 |
| 4,028,322 | 6/1977 | Mory | 534/767 |
| 4,171,301 | 10/1979 | Mory | 106/23 |
| 4,421,601 | 12/1983 | Stephan et al. | 106/23 |
| 4,628,082 | 12/1986 | Lorenz et al. | 534/767 |

FOREIGN PATENT DOCUMENTS

| | | | |
|---|---|---|---|
| 1544394 | 3/1971 | Germany . | |
| 2351294 | 4/1975 | Germany . | |
| 2535140 | 2/1976 | Germany | 534/767 |
| 1136673 | 12/1968 | United Kingdom | 534/767 |
| 1459547 | 12/1976 | United Kingdom . | |

Primary Examiner—Veronica P. Hoke
Attorney, Agent, or Firm—Connolly & Hutz

[57] ABSTRACT

Compound of the general formula (I)

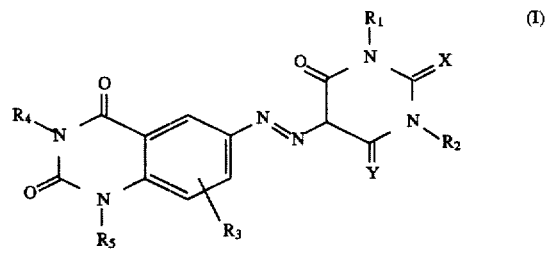

in which

X is an O or S atom or an imino group,

Y is an O atom or an imino group, $R_1$ and $R_2$ are a hydrogen atom, $C_1$–$C_4$-alkyl, an unsubstituted phenyl group or a substituted phenyl group having 1 to 5 substituents from the group consisting of $C_1$–$C_4$-alkyl, $C_1$–$C_4$-alkoxy, halogen, nitro, cyano, hydroxyl, $CF_3$, $CONH_2$, $CONH(C_5$–$C_6$-cycloalkyl), $CON(C_1$–$C_4$-alkyl)$_2$, $CONH(C_1$–$C_4$)-alkyl, $COO(C_1$–$C_4$)-alkyl, $COO(C_5$–$C_6$-cycloalkyl) and CONH(phenyl), with the proviso that at least one of the radicals $R_1$ or $R_2$ has one of the meanings mentioned which differ from hydrogen, $R_3$ is a hydrogen atom, a trifluoromethyl group, a halogen atom or a $C_1$–$C_4$-alkyl, a $C_1$–$C_4$-alkoxy, a nitro or a cyano group and $R_4$ and $R_5$ independently of one another are a hydrogen atom, $C_1$–$C_4$-alkyl, phenyl or a substituted phenyl group having 1 to 5 substituents from the group consisting of $C_1$–$C_4$-alkyl, $C_1$–$C_4$-alkoxy, halogen, nitro, cyano, hydroxyl, $CF_3$, $CONH_2$, $CONH(C_5$–$C_6$-cycloalkyl), $CON(C_1$–$C_4$-alkyl)$_2$, $CONH(C_1$–$C_4$)-alkyl, $COO(C_1$–$C_4$)-alkyl, $COO(C_5$–$C_6$-cycloalkyl) and CONH(phenyl).

12 Claims, No Drawings

WATER-INSOLUBLE AZO COLORANTS BASED ON AMINOQUINAZOLINEDIONES

The invention relates to azo pigments based on 6-aminoquinazoline-2,4-diones and N-substituted barbituric acids.

GB-A-1 136 673, U.S. Pat. No. 4,014,863 and U.S. Pat. No. 4,421,601 disclose azo pigments based on 6-aminoquinazolinedione and unsubstituted barbituric acid, but these no longer meet the current requirements in respect of heat stability, tinctorial strength and dispersibility in high molecular weight organic materials.

The present invention was based on the object of providing novel azo pigments having a yellow color shade, high heat stability and high tinctorial strength which meet the current requirements on pigments.

It has been found that azo pigments based on 6-aminoquinazolinediones and N-substituted barbituric acids surprisingly achieve the present object.

The present invention relates to azo pigments of the formula (I)

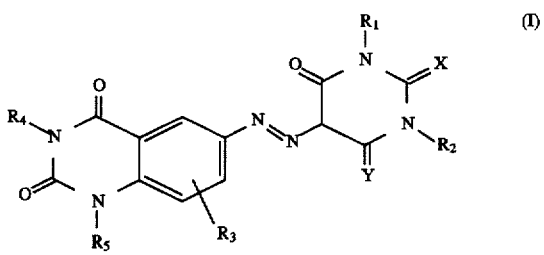

in which
X is an O or S atom or an imino group,
Y is an O atom or an imino group,
$R_1$ and $R_2$ are a hydrogen atom, $C_1$–$C_4$-alkyl, an unsubstituted phenyl group or a substituted phenyl group having 1 to 5, preferably 1 to 3, substituents from the group consisting of $C_1$–$C_4$-alkyl, $C_1$–$C_4$-alkoxy, halogen, nitro, cyano, hydroxyl, $CF_3$, $CONH_2$, $CONH(C_5$–$C_6$-cycloalkyl), CON($C_1$–$C_4$-alkyl)$_2$, $CONH(C_1$–$C_4$)-alkyl, $COO(C_1$–$C_4$)-alkyl, $COO(C_5$–$C_6$-cycloalkyl) and CONH(phenyl), with the proviso that at least one of the radicals $R_1$ or $R_2$ has one of the meanings mentioned which differ from hydrogen,
$R_3$ is a hydrogen atom, a trifluoromethyl group, a halogen atom or a $C_1$–$C_4$-alkyl, a $C_1$–$C_4$-alkoxy, a nitro or a cyano group and
$R_4$ and $R_5$ independently of one another are a hydrogen atom, $C_1$–$C_4$-alkyl, phenyl or a substituted phenyl group having 1 to 5, preferably 1 to 3, substituents from the group consisting of $C_1$–$C_4$-alkyl, $C_1$–$C_4$-alkoxy, halogen, nitro, cyano, hydroxyl, $CF_3$, $CONH_2$, $CONH(C_5$–$C_6$-cycloalkyl), $CON(C_1$–$C_4$-alkyl)$_2$, $CONH(C_1$–$C_4$)-alkyl, $COO(C_1$–$C_4$)-alkyl, $COO(C_5$–$C_6$-cycloalkyl) and CONH(phenyl).

Compounds of the formula (I) which are of particular interest are those in which
X is an O or an S atom,
Y is an O atom,
$R_1$ is a hydrogen atom or a $C_1$–$C_4$-alkyl group, preferably methyl or ethyl, or a phenyl group,
$R_2$ is a $C_1$–$C_4$-alkyl group, such as methyl or ethyl, or a phenyl group,
$R_3$ is a hydrogen atom, a trifluoromethyl group or a chlorine atom and
$R_4$ and $R_5$ independently of one another are a hydrogen atom, phenyl or $C_1$–$C_4$-alkyl, such as methyl or ethyl.

The formula (I) is to be understood as an idealized formula and also comprises the corresponding tautomeric compounds as well as the possible configuration isomers of each tautomeric form. The compounds of the formula (I) are usually present in the hydrazone form. The formula (I) therefore also includes, above all, the hydrazone form.

The present invention also relates to a process for the preparation of the compounds of the formula (I) according to the invention, which comprises diazotizing one or more amines of the formula (II)

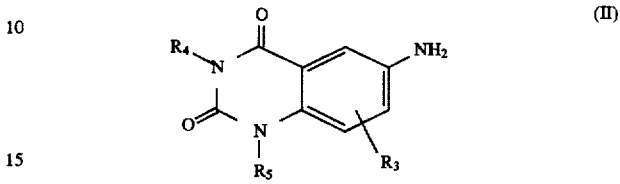

in which $R_3$, $R_4$ and $R_5$ have the meanings defined in formula (I), and coupling the diazotization products, in a molar ratio of 1:0.9 to 1.1, preferably 1:0.95 to 1.05, with one or more compounds of the formula (III)

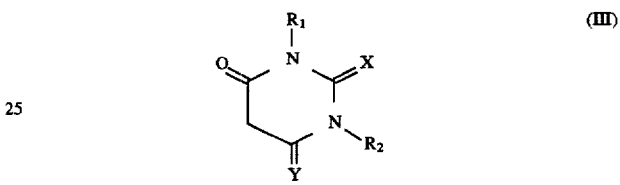

in which X, Y, $R_1$ and $R_2$ have the meanings defined in formula (I), under suitable conditions.

The formulae (II) and (III) are to be understood as idealized formulae, which also include the corresponding tautomeric compounds and the possible configuration isomers of each tautomeric form.

Suitable amines of the formula (II) are, for example, 6-amino-1H,3H-quinazoline-2,4-dione and substituted 6-amino-1H,3H-quinazoline-2,4-diones which, on the 5-, 7- or 8-position of the quinazoline system, in particular on the 7-position, have a substituent from the group consisting of halogen, in particular chlorine; trifluoromethyl; $C_1$–$C_4$-alkyl, in particular methyl or ethyl; $C_1$–$C_4$-alkoxy, in particular methoxy; nitro and cyano. Suitable amines are furthermore 6-amino-quinazoline-2,4-diones which, independently of a substitution on the 5-, 7- or 8-position, carry $C_1$–$C_4$-alkyl, preferably methyl or ethyl, phenyl, chlorophenyl, methylphenyl or methoxyphenyl on the 1-position and/or on the 3-position.

The preparation of such compounds is described in the literature, for example in Beilstein 5-24-07-00456 et seq., 5-24-07-00523 et seq., 4-25-00-04191 et seq. and in the references to earlier supplementary works cited therein. Compounds which are preferably used are 6-amino-1H,3H-quinazoline-2,4-dione, 7-trifluoromethyl-6-amino-1H,3H-quinazoline-2,4-dione, 7-chloro-6-amino-1H,3H-quinazoline-2,4-dione, 1-methyl6-amino-3H-quinazoline-2,4-dione, 1-phenyl-6-amino-3H-quinazoline-2,4-dione and 1,3-dimethyl-6-amino-quinazoline-2,4-dione.

Suitable coupling components of the formula (III) are, for example, 1-methylbarbituric acid, 1,3-dimethylbarbituric acid, 1-phenylbarbituric acid and 1,3-diethyl-2-thiobarbituric acid. The preparation of such compounds is described in the literature, for example in Beilstein 5-24-09-00094 et seq. and in the references to earlier supplementary works cited therein.

The compounds of the formula (I) according to the invention are prepared by processes known per se by coupling the diazotized amines with the coupling components mentioned in an aqueous medium, if appropriate in the presence of nonionic, anionic or cationic surface-active substances, which can have a turbidity point in the aqueous medium. If appropriate, further auxiliaries, such as naturally occurring or synthetic resins or resin derivtives, or customary additives for paints, printing inks or plastics, can also be used. The coupling can also be carried out completely or partly in organic solvents.

The coupling reaction is carried out by one of the customary methods in an aqueous medium, by a) adding a solution of the diazonium salt to a suspension or dispersion of the coupling component, or b) metering a solution of the diazonium salt and a solution, suspension or dispersion of the coupling component simultaneously into a buffer solution or into a mixing nozzle, or c) adding a solution of the coupling component to a solution of the diazonium salt, or d) adding a suspension or dispersion of the coupling component to a solution of the diazonium salt.

The process parameters of time, temperature and pH differ only little from those in conventional coupling processes and are thus known to the expert.

Method c is particularly advantageous in the process according to the invention.

The compounds of the formula (I) according to the invention are valuable water-insoluble colorants and can be isolated in the customary manner after the coupling reaction. It is often expedient for the azo pigments obtained after the coupling reaction to be subjected to an after-treatment (finish) to achieve the full tinctorial strength and a particularly favorable crystal structure. For example, for this purpose, the moist or dried pigments can be heated in organic solvents, such as, for example, pyridine, N-methyl-2-pyrrolidone, dimethylformamide, dimethyl sulfoxide, alcohols, chlorobenzenes, glacial acetic acid, quinoline, glycols, nitrobenzenes or aromatic hydrocarbons, for some time, if appropriate under increased pressure. In some cases, conversion into a favorable crystal structure or achievement of the full tinctorial strength is also already possible by heating with water, if appropriate under pressure and if appropriate with the addition of dispersing agents or organic solvents, for example of the above type.

The compounds of the formula (I) according to the invention are particularly suitable for pigmenting high molecular weight organic materials. High molecular weight organic materials are, for example, cellulose ethers and esters, such as ethylcellulose, nitrocellulose, cellulose acetate and cellulose butyrate, naturally occuring resins or synthetic resins, such as polymerization resins or condensation resins, for example aminoplasts, in particular urea- and melamine-formaldehyde resins, alkyd resins, acrylic resins and phenoplasts, polycarbonates, polystyrene, polyvinyl compounds, in particular polyvinyl chloride or polyvinyl acetate, polyolefins, in particular polyethylene and polypropylene, polyacrylic compounds, in particular polyacrylonitrile and polyacrylic acid esters, polyamides, polyurethanes or polyesters, rubber, casein, silicone and silicone resins, individually or as mixtures. Polyolefins, such as polyethylene and polypropylene, are particularly preferred as the medium.

It is of no importance here whether the high molecular weight organic compounds mentioned are present as plastic compositions, melts or in the form of spinning solutions, or are contained in lacquers, paints or printing inks. Depending on the intended use, it proves advantageous for the pigment formulations obtained according to the invention to be used as blends or in the form of preparations or dispersions. The pigments according to the invention are employed in an amount of preferably 0.1 to 10% by weight, based on the high molecular weight organic material to be pigmented.

The compounds of the formula (I) according to the invention are distinguished by a particularly high heat stability, good dispersibility in the high molecular weight organic materials and high tinctorial strength.

The water-insoluble compounds of the formula (I) prepared according to the invention are suitable as colorants in electrophotographic toners and developers, such as, for example, one- or two-component powder toners (also called one- or two-component developers), magnetic toners, liquid toners, polymerization toners and special toners (literature: L. B. Schein, "Electrophotography and Development Physics"; Springer Series in Electrophysics 14, Springer Verlag, 2nd edition, 1992).

Typical toner binders are polymerization, polyaddition and polycondensation resins, such as styrene, styrene/acrylate, styrene/butadiene, acrylate, polyester and phenolic epoxy resins, polysulfones and polyurethanes, individually or in combination, as well as polyethylene and polypropylene, which can also comprise other constituents, such as charge control agents, waxes or flow auxiliaries, or are subsequently modified with these additives.

The water-insoluble compounds of the formula (I) prepared according to the invention are furthermore suitable as colorants in powders and powder coatings, in particular in powder coatings which can be sprayed triboelectrically or electrokinetically and are used for coating the surface of objects, for example, metal, wood, plastic, glass, ceramic, concrete, textile material, paper or rubber (J. F. Hughes, "Electrostatics Powder Coating" Research Studies, John Wiley & Sons, 1984).

Epoxy resins, polyester resins containing carboxyl and hydroxyl groups and polyurethane and acrylic resins, together with customary hardeners, are typically employed as powder coating resins. Combinations of resins are also used. Thus, for example, epoxy resins are often employed in combination with polyester resins containing carboxyl and hydroxyl groups. Typical hardener components (depending on the resin system) are, for example, acid anhydrides, imidazoles and dicyandiamide and derivatives thereof, masked isocyanates, bisacylurethanes, phenolic and melamine resins, triglycidyl isocyanurates, oxazolines and dicarboxylic acids.

The water-insoluble compounds of the formula (I) prepared according to the invention are additionally suitable as colorants in ink-jet inks on an aqueous and non-aqueous basis and in those inks which operate by the hot-melt process.

To evaluate the properties of the pigments prepared according to the invention in the paint sector, an aromatic-containing alkyd-melamine resin paint (AM) based on a medium-oil, non-drying alkyd resin was chosen from the large number of paints known.

To evaluate the properties of the pigments prepared according to the invention in the plastics sector, plasticized polyvinyl chloride and polyethylene were chosen from the large number of plastics known.

To evaluate the properties of the pigments prepared according to the invention in the printing sector, an offset printing system based on an alkyd resin was chosen from the large number of printing systems known.

To evaluate the properties of the pigments prepared according to the invention in the toner sector, a toner system based on a polyester resin was chosen from the large number of toner systems known.

To evaluate the properties of the pigments prepared according to the invention in the powder coating sector, a resin system was chosen from the large number of powder coating systems known.

In the following examples, parts are parts by weight and percentages are percentages by weight.

PREPARATION EXAMPLES

Example 1 a) Diazonium salt solution 35.4 parts of 6-amino-1H,3H-quinazoline-2,4-dione are heated to the boiling point in 400 parts by volume of glacial acetic acid, and 60 parts by volume of 31% strength hydrochloric acid are added dropwise. After cooling to 20° C., 40 parts by volume of 5 normal sodium nitrite solution are added dropwise in the course of 5 minutes. The mixture is subsequently stirred at room temperature for 1 hour and then diluted with 660 parts by volume of water. The diazonium salt dissolves, the solution is clarified by filtration and the excess nitrite is destroyed by amidosulfonic acid.

b) Solution of the coupling component 40.8 parts of N-phenylbarbituric acid are dissolved in 600 parts by volume of water by addition of 24 parts by volume of 33% strength sodium hydroxide solution.

c) Coupling

The diazonium salt solution, 200 parts of ice and 78.2 parts of a 10% strength aqueous solution of a fatty alcohol polyglykol ether based on a $C_{16}$–$C_{18}$-alcohol, reacted with about 25 parts of ethylene oxide, are initially introduced into a coupling vessel. The pH is adjusted to 4.3 to 4.4 with 900 parts by volume of 4 normal sodium acetate solution. The solution of the coupling component is added to this mixture in the course of 50 to 60 minutes. When the coupling has ended, the pigment suspension is heated to 98° C. by passing in steam and kept at this temperature for 90 minutes. It is allowed to cool to 80° C. and the pigment is filtered off and washed with water.

d) After-treatment

The moist press-cake is heated to the boiling point in 1500 parts by volume of glacial acetic acid, while stirring, and kept at this temperature for 10 minutes. After cooling to 100° C., the pigment is filtered off with suction, washed with glacial acetic acid and then with acetone and dried at 65° C. After grinding, 63.6 parts of a yellow pigment are obtained. IR-spectrum:. 3440 $cm^{-1}$, 3178 $cm^{-1}$, 3065$^{-1}$, 2843 $cm^{-1}$, 1711 $cm^{-1}$, 1642 $cm^{-1}$, 1521 $cm^{-1}$, 1420 $cm^{-1}$, 1278 $cm^{-1}$, 1212 $cm^{-1}$, 720 $cm^{-1}$.

If the procedure is analogous to the Preparation Example and other bases and coupling components corresponding to the following Table 1 are employed instead of 6-amino-1H, 3H-quinazoline-2,4-dione, as the base, and N-phenylbarbituric acid, as the coupling component, valuable pigments are likewise obtained:

TABLE 1

| Example No. | Base | Coupling component | Color of the pigment |
|---|---|---|---|
| 2 | 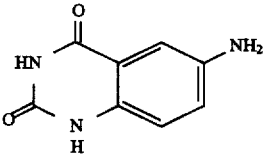 | 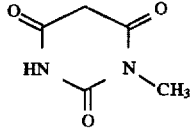 | yellow |
| 3 | 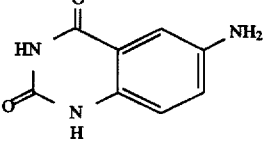 | 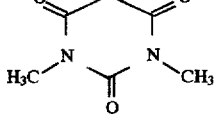 | yellow |
| 4 | 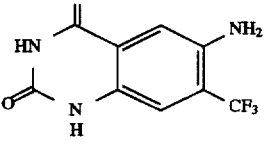 | 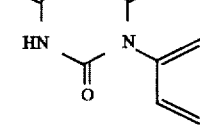 | yellow |
| 5 |  | 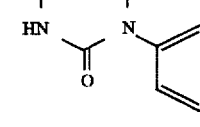 | yellow |

TABLE 1-continued

| Example No. | Base | Coupling component | Color of the pigment |
|---|---|---|---|
| 6 | [structure: 2-acetamido-5-amino-benzamide] | [structure: N,N'-dimethyl thiomalondiamide] | yellow/reddish-tinged |
| 7 | [structure: 2-acetamido-4-chloro-5-amino-benzamide] | [structure: N-phenyl malonamide] | reddish-tinged yellow |
| 8 | [structure: 2-acetamido-N-methyl-4-chloro-5-amino-benzamide] | [structure: N-phenyl malonamide] | reddish-tinged yellow |
| 9 | [structure: 2-acetamido-N-methyl-5-amino-benzamide] | [structure: N-phenyl malonamide] | yellow |
| 10 | [structure: 2-acetamido-N-phenyl-5-amino-benzamide] | [structure: N-phenyl malonamide] | yellow |

Use Examples:

The pigment from Example 1 gives, in the AM paint, an opaque and intensely colored coating which has a high fastness to light. In offset printing, glossy and intensely colored prints are obtained. In plasticized polyvinyl chloride, good dispersibilities, high tinctorial strengths and pure color shades are obtained. Testing in polyethylene shows high heat stabilities and high tinctorial strengths. Testing in the toner system shows compatibility and homogeneous dispersibility in the binder, a high tinctorial strength and favorable transparency. The constant electrostatic influence on the toner system during triboelectric charging is particularly advantageous. Testing in the powder coating system demonstrates the sprayability of the coating and its deposition on the workpiece.

The pigments from Examples 2 to 6 give, in the AM paint, intensely colored coatings with pure color shades.

I claim:
1. A compound of the formula (I)

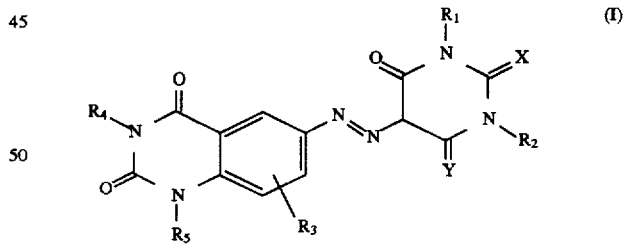

in which
X is an O or S atom or an imino group,
Y is an O atom or an imino group,
$R_1$ and $R_2$ are a hydrogen atom, $C_1$–$C_4$-alkyl, an unsubstituted phenyl group or a substituted phenyl group having 1 to 5 substituents selected from the group consisting of $C_1$–$C_4$alkyl, $C_1$–$C_4$-alkoxy, halogen, nitro, cyano, hydroxyl, $CF_3$, $CONH_2$, $CONH(C_5$–$C_6$-cycloalkyl), $CON(C_1$–$C_4$-alkyl$)_2$, $CONH(C_1$–$C_4$)-alkyl, $COO(C_1$–$C_4$)-alkyl, $COO$ ($C_5$–$C_6$-cycloalkyl) and CONH(phenyl), with the proviso that at least one of the radicals $R_1$ or $R_2$ has one of the meanings mentioned which differ from hydrogen,
$R_3$ is a hydrogen atom, a trifluoromethyl group, a halogen atom or a $C_1$–$C_4$-alkyl, a $C_1$–$C_4$-alkoxy, a nitro or a cyano group and $R_4$ and $R_5$ independently of one another are a hydrogen atom, $C_1$–$C_4$-alkyl, phenyl or a substituted phenyl group having 1 to 5 substituents selected from the group consisting of $C_1$–$C_4$-alkyl, $C_1$–$C_4$-alkoxy, halogen, nitro, cyano, hydroxyl, $CF_3$, $CONH_2$, $CONH(C_5$–$C_6$-cycloalkyl), $CON(C_1$–$C_4$-alkyl$)_2$, $CONH(C_1$–$C_4)$-alkyl, $COO(C_1$–$C_4)$-alkyl, $COO(C_5$–$C_6$-cycloalkyl) and CONH(phenyl).

2. A compound as claimed in claim 1, in which
X is an O or S atom,
Y is an O atom,
$R_1$ is a hydrogen atom, a $C_1$–$C_4$-alkyl group or a phenyl group,
$R_2$ is a $C_1$–$C_4$-alkyl group or a phenyl group,
$R_3$ is a hydrogen atom, a chlorine atom or a $CF_3$ group,
$R_4$ is a hydrogen atom, phenyl or $C_1$–$C_4$-alkyl and
$R_5$ is a hydrogen atom, phenyl or $C_1$–$C_4$-alkyl.

3. A compound as claimed in claim 1, in which the $C_1$–$C_4$-alkyl groups are each methyl or ethyl.

4. A compound as claimed in claim 1, in which the radical $R_3$ is on the 7-position of the quinazoline system.

5. A compound as claimed in claim 1, in which
$R_1$ is phenyl,
$R_2$, $R_3$, $R_4$ and $R_5$ are each hydrogen and
X and Y are each an O atom.

6. A process for the preparation of a compound as claimed in claim 1, which comprises diazotizing one or more amines of the formula (II)

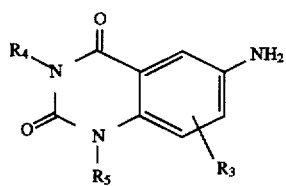

(II)

in which $R_3$, $R_4$ and $R_5$ have the meanings defined in formula (I), and coupling the diazotization products, in a molar ratio of 1:0.9 to 1.1, with one or more compounds of the formula (III)

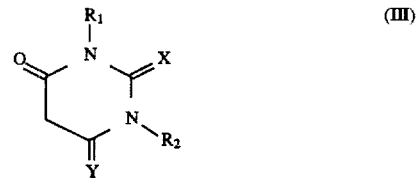

(III)

in which X, Y, $R_1$ and $R_2$ have the meanings defined in formula (I).

7. A process as claimed in claim 6, wherein the molar ratio is 1:0.95 to 1.05.

8. A method for pigmenting a substrate selected from the group consisting of polymers, lacquers, paints, printing inks, electropliotographic toners and developers, powders and powder coatings which can be sprayed triboelectrically or electrokinetically, and inks, comprising the step of incorporating a compound of the formula (I) as claimed in claim 1 into said substrates.

9. The method as claimed in claim 8, wherein the high molecular weight organic medium is a polyolefin.

10. The method as claimed in claim 9, wherein the polyolefin is polyethylene or polypropylene.

11. The method as claimed in claim 8, wherein the inks are printing inks.

12. The method as claimed in claim 8, wherein the substrate is selected from the group consisting of ethylcellulose, nitrocellulose, cellulose acetate, cellulose butyrate, urea-formaldehyde resins, melamine-formaldehyde resins, alkyd resins, acrylic resins, phenoplasts, polyvinyl chloride, polyvinylacetate, polyethylene, polypropylene, polyacrylonitrile and polyacrylic acid esters.

* * * * *